United States Patent
Quartarone et al.

(10) Patent No.: US 11,912,416 B2
(45) Date of Patent: Feb. 27, 2024

(54) HYDROGEN SYSTEMS FOR ENVIRONMENTAL CONTROL SYSTEMS ONBOARD AIRCRAFT

(71) Applicant: Hamilton Sundstrand Corporation, Charlotte, NC (US)

(72) Inventors: Giusi Quartarone, Mayfield (IE); Erica Zavaglio, Cork (IE); Federico Mattia Benzi, Cork (IE); Ram Ranjan, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 93 days.

(21) Appl. No.: 17/470,537

(22) Filed: Sep. 9, 2021

(65) Prior Publication Data
US 2023/0069975 A1   Mar. 9, 2023

(51) Int. Cl.
| | | |
|---|---|---|
| *B64D 13/06* | (2006.01) | |
| *B64D 37/30* | (2006.01) | |
| *B64D 37/34* | (2006.01) | |
| *B64D 13/08* | (2006.01) | |
| *B64D 37/10* | (2006.01) | |

(52) U.S. Cl.
CPC ............ *B64D 13/06* (2013.01); *B64D 13/08* (2013.01); *B64D 37/10* (2013.01); *B64D 37/30* (2013.01); *B64D 37/34* (2013.01); *B60L 2200/10* (2013.01); *B64D 2013/0614* (2013.01); *B64D 2013/0618* (2013.01); *B64D 2013/0644* (2013.01); *B64D 2013/0688* (2013.01)

(58) Field of Classification Search
CPC ........ B64D 37/34; B64D 37/30; B64D 13/06; H01M 8/04111
See application file for complete search history.

(56) References Cited

U.S. PATENT DOCUMENTS

| | | |
|---|---|---|
| 10,224,556 B2 | 3/2019 | Lents et al. |
| 10,978,723 B2 | 4/2021 | Lo et al. |

(Continued)

FOREIGN PATENT DOCUMENTS

| | | |
|---|---|---|
| CN | 105620760 A | 6/2016 |
| DE | 102018209480 A1 * | 12/2019 |

(Continued)

OTHER PUBLICATIONS

European Search Report for European Application No. 22194642.9; dated Feb. 2, 2023; 7 pages.

*Primary Examiner* — Timothy D Collins
*Assistant Examiner* — Justin Michael Heston
(74) *Attorney, Agent, or Firm* — CANTOR COLBURN LLP

(57) ABSTRACT

Aircraft systems including a pressurized fuel tank containing a pressurized fuel, a turbo expander configured to receive the pressurized fuel from the fuel tank, the turbo expander configured to decrease a pressure of the pressurized fuel to generate low pressure fuel having pressure less than the pressurized fuel, a fuel-to-air heat exchanger configured to receive the low pressure fuel from the turbo expander as a first working fluid and air as a second working fluid, the heat exchanger configured to cool the air and warm the fuel, an aircraft cabin configured to receive the cooled air, and a fuel consumption system configured to consume the fuel to generate power.

20 Claims, 5 Drawing Sheets

(56) References Cited

U.S. PATENT DOCUMENTS

| | | | |
|---|---|---|---|
| 2012/0237844 A1* | 9/2012 | Muetschele | H01M 8/04089 429/429 |
| 2012/0240599 A1* | 9/2012 | Stolte | B64D 13/08 62/89 |
| 2016/0190622 A1* | 6/2016 | Whyatt | H01M 8/04097 429/423 |
| 2020/0002009 A1* | 1/2020 | Quartarone | B64D 13/08 |
| 2022/0195928 A1* | 6/2022 | Johnson | F02C 3/107 |

FOREIGN PATENT DOCUMENTS

| | | | |
|---|---|---|---|
| DE | 102018209480 A1 | 12/2019 | |
| EP | 1386837 A1 * | 2/2004 | B64D 13/06 |
| WO | WO-2020079419 A1 * | 4/2020 | B60L 1/02 |

* cited by examiner

HYDROGEN SYSTEMS FOR ENVIRONMENTAL CONTROL SYSTEMS ONBOARD AIRCRAFT

TECHNICAL FIELD

The present disclosure relates generally to aircraft systems, and more specifically to pressurized hydrogen or other cold fuels and related systems for aircraft.

BACKGROUND

Aircraft typically include propulsion systems, such as gas turbine engines or other engines or propulsion systems. Further, for aircraft that include passenger compartments, air conditioning is required to maintain a cabin at desired pressures and temperatures for passengers and/or crew. Conventionally, an aircraft will include an environmental control system (ECS) for generating and supplying conditioned air to a cabin or for other onboard purposes. Fuel burn consumption associated with aircraft ECS depends on different factors, such as the amount of bleed and ram air usage, electric power consumption, and the weight of the system. Improved systems for propulsion, power generation, and environmental control may be desirable for aircraft.

BRIEF SUMMARY

According to some embodiments, aircraft systems are provided. The aircraft systems include a pressurized fuel tank containing a pressurized fuel, a turbo expander configured to receive the pressurized fuel from the pressurized fuel tank, the turbo expander configured to decrease a pressure of the pressurized fuel to generate low pressure fuel, the low pressure fuel having a pressure that is less than the pressurized fuel, a fuel-to-air heat exchanger configured to receive the low pressure fuel from the turbo expander as a first working fluid and air as a second working fluid, the heat exchanger configured to cool the air and warm the fuel to generate treated fuel, an aircraft cabin configured to receive the cooled air, and a fuel consumption system configured to consume the treated fuel to generate power.

In addition to one or more of the features described above, or as an alternative, further embodiments of the aircraft systems may include that the pressurized fuel is pressurized hydrogen.

In addition to one or more of the features described above, or as an alternative, further embodiments of the aircraft systems may include that the pressurized fuel is pressurized ammonia.

In addition to one or more of the features described above, or as an alternative, further embodiments of the aircraft systems may include that the turbo expander is part of a turbo-compressor comprising a compressor operably coupled to the turbo expander by a shaft.

In addition to one or more of the features described above, or as an alternative, further embodiments of the aircraft systems may include that the compressor is configured to receive ram air, modulate the ram air flow, and compress said ram air and increase pressure thereof, the increased pressure ram air being directed to the fuel-to-air heat exchanger.

In addition to one or more of the features described above, or as an alternative, further embodiments of the aircraft systems may include a motor operably coupled to the shaft and configured to generate at least one of electrical power and mechanical power.

In addition to one or more of the features described above, or as an alternative, further embodiments of the aircraft systems may include an electric generator operably coupled to the turbo expander by a shaft, the electric generator configured to generate electric power.

In addition to one or more of the features described above, or as an alternative, further embodiments of the aircraft systems may include that the fuel consumption system is a fuel cell.

In addition to one or more of the features described above, or as an alternative, further embodiments of the aircraft systems may include that the fuel cell is one of a solid oxide fuel cell and a proton exchange membrane (PEM).

In addition to one or more of the features described above, or as an alternative, further embodiments of the aircraft systems may include that the fuel cell receives pressurized air containing oxygen.

In addition to one or more of the features described above, or as an alternative, further embodiments of the aircraft systems may include that the pressurized air is pressurized in a compressor operably coupled to the turbo expander.

In addition to one or more of the features described above, or as an alternative, further embodiments of the aircraft systems may include that the fuel consumption system is a hydrogen burning engine.

In addition to one or more of the features described above, or as an alternative, further embodiments of the aircraft systems may include an additional heat exchanger arranged between the fuel-to-air heat exchanger and the fuel consumption system, wherein the additional heat exchanger receives the fuel from the fuel-to-air heat exchanger as a first working fluid and an aircraft system working fluid as a second working fluid.

In addition to one or more of the features described above, or as an alternative, further embodiments of the aircraft systems may include that the aircraft system working fluid is a fluid used to cool aircraft powered electronics.

In addition to one or more of the features described above, or as an alternative, further embodiments of the aircraft systems may include a fan configured to direct air into the fuel-to-air heat exchanger.

According to some embodiments, aircraft are provided. The aircraft include a fuselage, wings, and a pressurized fuel tank containing a pressurized fuel. A turbo expander is configured to receive the pressurized fuel from the pressurized fuel tank, the turbo expander configured to decrease a pressure of the pressurized fuel to generate low pressure fuel, the low pressure fuel having a pressure that is less than the pressurized fuel, a fuel-to-air heat exchanger is configured to receive the low pressure fuel from the turbo expander as a first working fluid and air as a second working fluid, the heat exchanger configured to cool the air and warm the fuel to generate treated fuel, an aircraft cabin is configured to receive the cooled air, and a fuel consumption system is configured to consume the treated fuel to generate power. The fuel consumption system is installed to at least one of the fuselage and the wings.

In addition to one or more of the features described above, or as an alternative, further embodiments of the aircraft may include that the fuel consumption system is a fuel cell system configured to generate power for flight of the aircraft.

In addition to one or more of the features described above, or as an alternative, further embodiments of the aircraft may include a fan configured to direct air into the fuel-to-air heat exchanger when the aircraft is on the ground.

In addition to one or more of the features described above, or as an alternative, further embodiments of the aircraft may include that the air in the fuel-to-air heat exchanger is recirculated cabin air from a cabin of the aircraft.

In addition to one or more of the features described above, or as an alternative, further embodiments of the aircraft may include that the fuel-to-air heat exchanger is configured to receive air from a ram air source.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
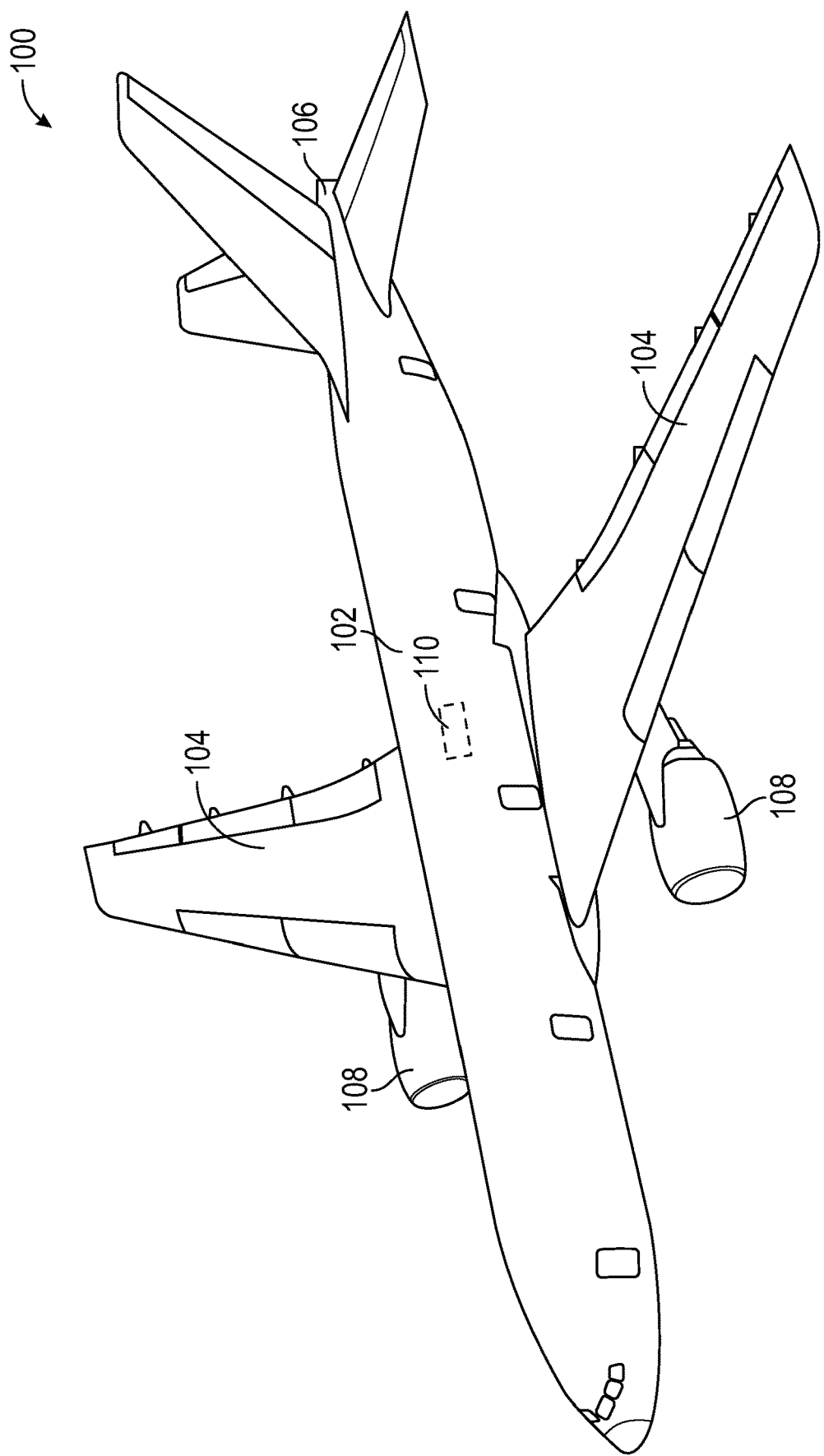
FIG. 1 is a schematic illustration of an aircraft that may incorporate embodiments of the present disclosure.

Referring to FIG. 1, a schematic illustration of an aircraft 100 that may incorporate embodiments of the present disclosure is shown. The aircraft 100 includes a fuselage 102, wings 104, and a tail 106. In this illustrated embodiment, the aircraft 100 includes wing-mounted aircraft power systems 108. The wing-mounted aircraft power systems 108 may be convention gas turbine engines, fuel-cell based propulsion systems, or other propulsion systems as known in the art. In other configurations, aircraft employing embodiments of the present disclosure may include fuselage-mounted and/or tail-mounted configurations. Further, any number of fuel-cell based propulsion systems may be employed, from one to four or more, depending on the aircraft configuration and power and thrust needs thereof. The aircraft power systems 108 may be used to generate thrust for flight and may also be used to generate onboard electrical power, particularly in a fuel cell configuration. The aircraft 100 may also include auxiliary power units 110 that may be fuel cell based, or otherwise configured to generate power. The aircraft power systems 108, in other configurations, may be fuel burning engines similar to conventional gas turbine engines.

Such fuel cell based power systems (for power generation and/or for propulsion) and/or combustion engine power systems may employ various types of fuel, including hydrogen. For example, turning now to FIG. 2, a schematic diagram of an aircraft power system 200 in accordance with an embodiment of the present disclosure is shown. The aircraft power system 200 is a non-combustion system, and includes a fan 202, a drive shaft 204, a motor 206, and an aircraft power generation system 208. The fan 202 is operably coupled to and configured to be rotated by the drive shaft 204 to generate thrust, similar to a fan and fan section of a conventional gas turbine engine. But, in the fuel cell configuration of FIG. 2, there is no core flow path and no turbine section(s) driven by combusted and expanded gas. Rather, the drive shaft 204 that drives rotation of the fan 202 is operably coupled to and driven by the motor 206. The motor 206 may be an electric motor that converts electrical power to mechanical (rotational) energy. The motor 206 receives power from the aircraft power generation system 208 along an electrical connection 210. The aircraft power system 200 may be configured to operate within similar limits and envelops as a conventional gas turbine engine.

The fan 202, the drive shaft 204, and the motor 206 may be arranged along a propulsion system central longitudinal axis A. The fan 202, the drive shaft 204, the motor 206, and the aircraft power generation system 208 can be mounted, installed, or otherwise housed within a propulsion system housing 212 (e.g., a nacelle for wing-mounted applications) which includes an exit nozzle 214 for directing an airflow therethrough for the purpose of driving flight of an aircraft (e.g., generating thrust). The propulsion system housing 212 may be configured to be mounted to a wing or fuselage of an aircraft.

The aircraft power generation system 208 may be a fuel cell or similar power source (e.g., a solid oxide fuel cell, proton exchange member (PEM), or the like). The aircraft power generation system 208 can be configured to not only power the motor 206 but also may be used as a power source for other propulsion system components and/or other aircraft electrical systems and components. In one non-limiting example, the aircraft power generation system 208 may be configured to output about 1 MW to about 10 MW electrical power. In accordance with embodiments of the present disclosure, the aircraft power generation systems may be configured to generate at least 1 MW of electrical power (e.g., less power may be used if the system is not used for propulsion). It will be appreciated that when used as a propulsion configuration, the aircraft power generation systems described herein are configured to generate, at least, sufficient power to drive the fan 202 and provide sufficient thrust and propulsion for flight at cruise altitudes. The amount of electrical power may be selected for a given aircraft configuration (e.g., size, operating envelope requirements, etc.).

Whether used for propulsion or only onboard electrical power, the aircraft power generation system 208 may be configured to combine hydrogen (e.g., liquid, compressed, supercritical, etc.) or other organic fluids as a fuel source using a fuel cell for generation of electricity. The hydrogen can also be used as the cold sink to cool aircraft environmental control system working fluids and/or provide other onboard thermal management, prior to being supplied to the fuel cell. In some embodiments, the fuel cell of the aircraft power generation system 208 can be configured to provide base electric power (e.g., suited for cruise operation). In some non-limiting configurations, some fuel (hydrogen) may be directed to bypass the fuel cell and be used in a small gas turbine to generate additional power for take-off and climb peak power needs.

Figure 3:
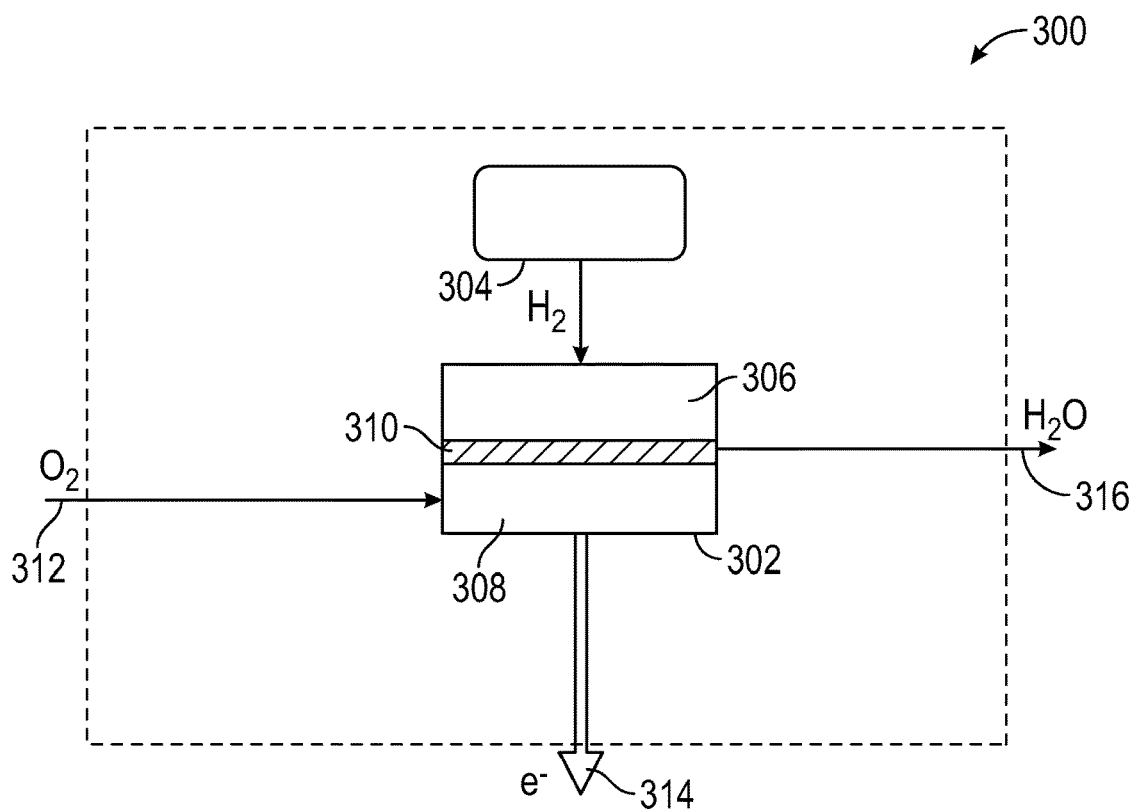
FIG. 3 is a schematic diagram of an aircraft power generation system in accordance with an embodiment of the present disclosure.

Turning now to FIG. 3, a schematic diagram of an aircraft power generation system 300 in accordance with an embodiment of the present disclosure is shown. The aircraft power generation system 300 includes a fuel cell 302 and a fuel source 304 (such as a hydrogen fuel source). The fuel cell 302 is configured to generate electricity, as will be appreciated by those of skill in the art (e.g., a solid oxide fuel cell, PEM, or the like). In this illustrative configuration, the fuel cell 302 includes an anode 306, a cathode 308, and an electrolyte membrane 310 arranged therebetween. The fuel cell 302 is supplied hydrogen ($H_2$) from the fuel source 304. The fuel source 304 may be a container or tank that houses liquid, compressed gas, supercritical fluid (e.g., the hydrogen in this example), or other fluid state of a fuel (e.g., gas phase hydrogen). The fuel cell 302 is supplied with oxygen ($O_2$) from an oxygen source at an inlet 312. In some embodiments, the $O_2$ may be supplied from ambient air, such as using an intake or scoop on a housing assembly, as will be appreciated by those of skill in the art. The $O_2$ and the $H_2$ are combined within the fuel cell 302 across the electrolyte membrane 310, which frees electrons for electrical power output 314. The combined $O_2$ and $H_2$ results in the formation of water ($H_2O$), which may be passed through an outlet 316 and dumped overboard, supplied into an onboard water tank, or otherwise used onboard an aircraft, as will be appreciated by those of skill in the art.

Figure 2:
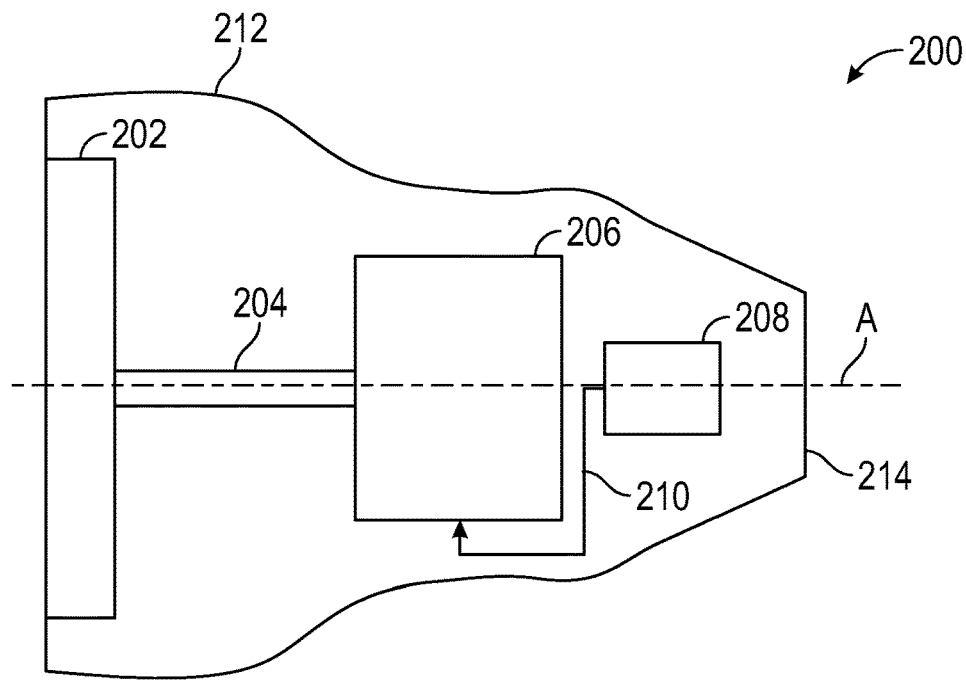
FIG. 2 is a schematic diagram of an aircraft power system for an aircraft in accordance with an embodiment of the present disclosure.

The electrical power output 314 may be electrically connected to a motor that is configured to drive a shaft and a fan of a propulsion system to generate thrust (e.g., as shown in FIG. 2). The electrical power output 314 may also or alternatively be electrically connected to other electrical systems of a propulsion system and/or aircraft system(s), as will be appreciated by those of skill in the art to provide electrical power thereto.

In some fuel cell systems, highly pressurized hydrogen may be stored within a pressure tank or container and extracted to be used within a fuel cell for power generation. Before using highly pressurized $H_2$ in a fuel cell, it is required to reduce the pressure of the $H_2$ to more manageable and/or safe pressure levels. Accordingly, embodiments of the present disclosure are directed to, in part, systems for expanding and reducing the pressure of pressurized $H_2$ that is supplied to a fuel cell for generation of electrical power onboard an aircraft (for propulsion or otherwise).

Fuel burn consumption associated with aircraft Environmental Control Systems (ECS) depends on different factors, such as the amount of bleed and ram air usage, electric power consumption, and the weight of the system. The use of cryogenic or high pressure low carbon fuels, such as hydrogen ($H_2$), ammonia ($NH_3$) and the like, in aircrafts has the potential to significantly reduce the ECS fuel burn consumption.

In order to reach a manageable $H_2$ volume, the hydrogen must either be highly compressed (between 300-850 bar) or cryogenically cooled to liquid state (~−253° C.=~20K). Because the use of liquid hydrogen in aircrafts presents several challenges, the development of pressurized fuel systems for aircraft that employ compressed fuels may be advantageous. However, a drawback of compressed fuels is the heavy tanks required to maintain the pressures of the fuel (e.g., pressurized gaseous $H_2$) can make such applications difficult to implement.

Embodiments of the present disclosure are directed to pressurized fuel onboard an aircraft that has reduced weights and improved system performance as compared to prior systems. Advantageously, in some embodiments, the ECS systems of the aircraft may be overhauled such that the ECS pack is eliminated partially or entirely, and replaced or supplemented by a fuel-based system that cools air for use onboard the aircraft (e.g., for cabin air conditioning).

Figure 4:
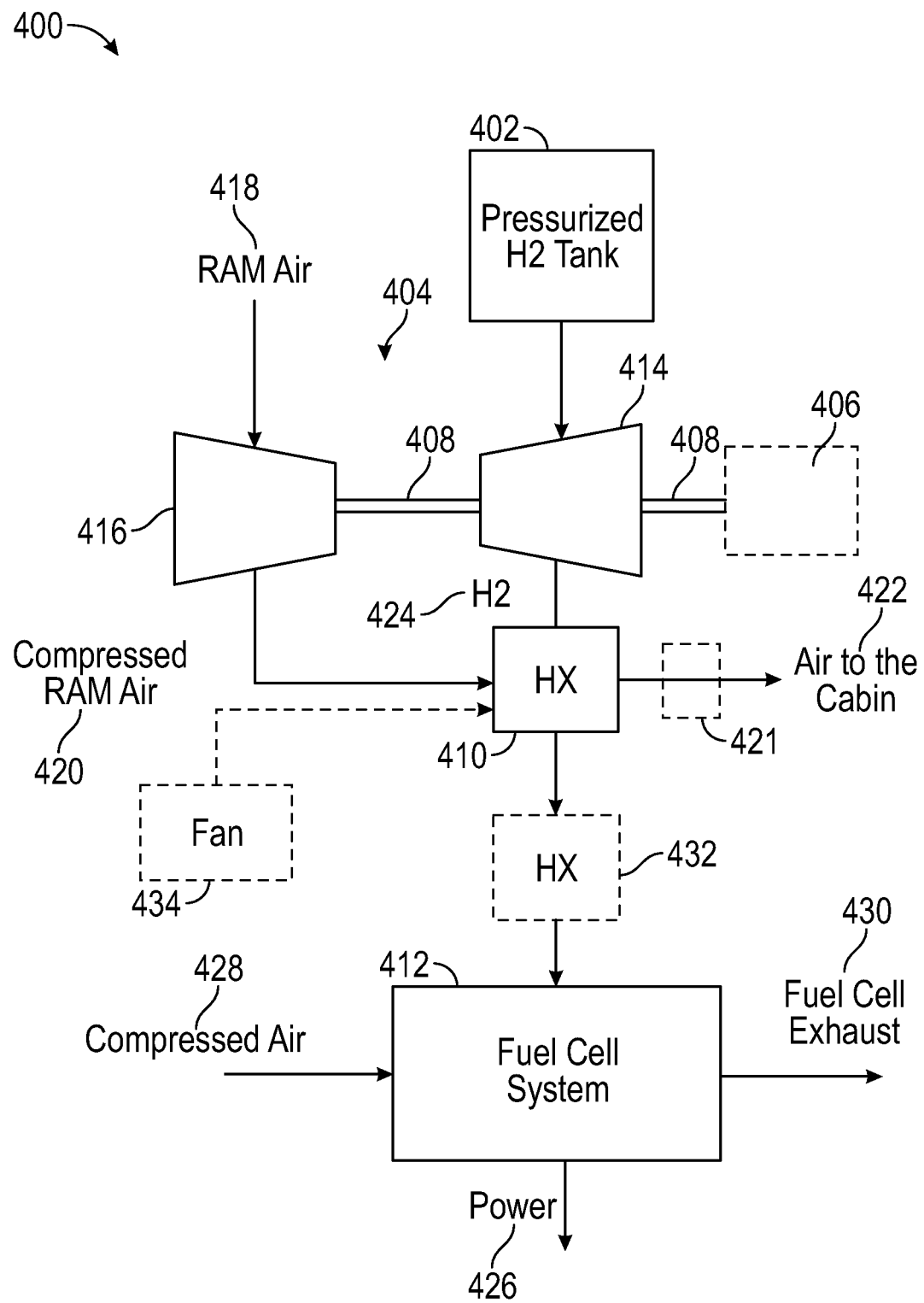
FIG. 4 is a schematic diagram of an aircraft pressurized hydrogen power system in accordance with an embodiment of the present disclosure.

Referring now to FIG. 4, an aircraft pressurized hydrogen power system 400 is schematically shown. The pressurized hydrogen power system 400 includes a pressurized $H_2$ tank 402, a turbo-compressor 404, an optional electric motor 406 operably connected to a shaft 408 of the turbo-compressor 404, a fuel-to-air heat exchanger 410, and a fuel cell system 412. The fuel cell system 412 may be configured similar to that shown and described above, such as in FIGS. 2-3, for example. In some embodiments, the fuel cell system 412 may be configured to generate electrical power sufficient for flight propulsion or may be configured to generate electrical power for use onboard the aircraft (e.g., to power electrical systems of the aircraft).

The turbo-compressor 404 includes a turbo expander 414 and a compressor 416 operably coupled to the shaft 408. In operation, highly pressurized $H_2$ expands within the turbo expander 414. The expansion of the $H_2$ within the turbo expander 414 drives rotation of the shaft 408. The shaft 408, in this configuration, is operably connected to the compressor 416 and the optional electric motor 406. As such, the rotation of the turbo expander 414 causes the compressor 416 to rotate. In some configuration the optional electric motor 406 may be used to impart additional power or rotation to the shaft 408 to assist in driving rotation of the compressor 416. The compressor 416 is configured to receive ram air 418 from a ram air source, such as a scoop or other inlet onboard the aircraft. In this configuration, the compressor 416 is used to increase the pressure of the ram air 418 to generate compressed ram air 420. The compressed ram air 420 is passed through the fuel-to-air heat exchanger 410 which cools the compressed ram air 420 to sufficient temperatures to be delivered to a space onboard an aircraft, such as a cabin of the aircraft and used for cabin air conditioning 422. The compressed ram air may also be used in the fuel cell to achieve improved performance (e.g., efficiency and/or power density) during cruise (e.g., flight) when ambient pressure is too low to achieve desired or necessary fuel cell power density.

The treating of the ram air 418 is driven by the pressurized $H_2$ sourced from the pressurized $H_2$ tank 402. An optional pump or other device, not shown, may be used to extract the pressurized $H_2$ from the pressurized $H_2$ tank 402 and direct the $H_2$ to the turbo expander 414 of the turbo-compressor 404. As the $H_2$ passes through the turbo expander 414, the pressure of the $H_2$ will be reduced. The expanded $H_2$ 424 is then passed through the fuel-to-air heat exchanger 410 where the compressed ram air 420 is cooled by the expanded $H_2$ 424 while the expanded $H_2$ 424 is increased in temperature.

While expanding in the turbo expander 414, the temperature of the $H_2$ is reduced. However, before the expanded $H_2$ 424 is fed into the fuel cell system 412, the temperature of the expanded $H_2$ 424 must be increased to proper levels for use within the fuel cell system 412. Therefore, the relatively cold expanded $H_2$ is used within the fuel-to-air heat exchanger 410 to cool down the compressed ram air 420 before it enters an optional mixing chamber 421. The optional mixing chamber 421 may be arranged downstream of the fuel-to-air heat exchanger 410 to receive the conditioned air from the fuel-to-air heat exchanger 410 and recycled or recirculated air from the space it is supplied to (e.g., an aircraft cabin). As such, a mixture of conditioned and recycled air may be supplied to the space (e.g., cabin) of the aircraft.

In one non-limiting embodiment, the $H_2$ stored within the pressurized $H_2$ tank 402 may be at temperatures of approximately −40° C. (about 230 K) and stored at pressures of approximately 85,000 kPa. The expanded $H_2$ 424 may be cooled to temperatures of about −180° C. (about 90 K) but has a pressure of about 250 kPa. This relatively cold but relatively low pressure $H_2$ is supplied into the fuel-to-air heat exchanger 410. In this same non-limiting embodiment, the ram air 418 may have ambient air temperatures and be at a pressure of about 30 kPa. As the ram air 418 is compressed within the compressor 416, the temperature of the compressed ram air 420 may be about 50° C. (about 320 K) and the pressure may be increased to about 75 kPa and supplied into the fuel-to-air heat exchanger 410. As these two flows are passed into the fuel-to-air heat exchanger 410, the air portion (the compressed ram air 420) will decrease in temperature and the $H_2$ will be increased in temperature. For example, the air may be reduced in temperature down to about 10° C. (about 280 K) and the $H_2$ may be increased in temperature up to about −170° C. (about 100 K). The output results in cool cabin air conditioning 422 and $H_2$ at appropriate temperatures for catalyzing within the fuel cell system 412 for the purpose of generating power 426. It will be appreciated that the values discussed in this non-limiting embodiment are merely for explanatory and illustrative purposes, and other values may be employed without departing from the scope of the present disclosure. Further, the various pressures and temperatures may be governed, at least in part, on the size and configuration of the pressurized $H_2$ tank 402, the size and configuration of the turbo compressor 404, and the size, configuration, and number of the heat exchangers that are employed. It will be appreciated that the relatively high pressure of the compressed fuel may be at least three times or greater in pressure than the pressure of the low pressure fuel after passing through the fuel-to-air heat exchanger. In some embodiments, the change in pressure from the high pressure compressed fuel to the low pressure fuel may be three times reduction in pressure or density, ten times reduction in pressure or density, one hundred times reduction in pressure or density, or other change in pressure or density as the fuel is warmed and expanded through the fuel-to-air heat exchanger.

The fuel cell system 412 requires a source of $O_2$, as discussed above. In some embodiments, bleed air or ram air may be used to provide the $O_2$ to the fuel cell system 412. Such air is typically compressed, and thus a compressed air 428 is provided to the fuel cell system 412. In some embodiments, a source of the $O_2$ of the fuel cell system 412 may be the compressed ram air 420 that is compressed in the compressor 416 of the turbo compressor 404 (e.g., air 420 and air 428 are the same). In such a configuration, the energy stored as compressed $H_2$ is converted to support both the cabin air 422 and the fuel cell system airflow 428.

The fuel cell system 412 will combine the $H_2$ and the $O_2$ from the compressed air 428 to generate power and output a fuel cell exhaust 430, in the form of water, as discussed above. The water of the fuel cell exhaust 430 may be dumped overboard, captured for use onboard the aircraft, or otherwise used onboard the aircraft, as appreciated by those of skill in the art.

In some configurations, additional warming of the $H_2$ may be required after passing through the fuel-to-air heat exchanger 410 before the $H_2$ is fed into the fuel cell system 412. Accordingly, the warmed $H_2$ may be passed through an optional additional $H_2$ heat exchanger 432. As an example, the relatively still cold $H_2$ may be used within the additional $H_2$ heat exchanger to cool down other components such as power electronics or electric motors of the aircraft. In some such embodiments, the additional $H_2$ heat exchanger 432 may have a liquid or gas as the other working fluid, depending upon the type of additional cooling provided. This working fluid will be cooled by the $H_2$ and thus the $H_2$ will be increased in temperatures before being supplied into the fuel cell system 412.

The cooling of the compressed ram air 420 within the fuel-to-air heat exchanger 410 may be sufficient for use directly to a cabin, or with minimal additional processing. As such, in accordance with some embodiments of the present disclosure, the pressurized hydrogen power system 400 described herein may eliminate the need for an environmental control system (ECS) pack onboard the aircraft. If such ECS pack is eliminated from the aircraft system, an additional fan 434 may be required to be used when the aircraft is on the ground to bring external air into the system. When the aircraft is on the ground, a fresh air flow from the fan 434 does not require to be compressed, and such air may bypass the compressor 416 and flow directly into the fuel-to-air heat exchanger 410.

Figure 5:
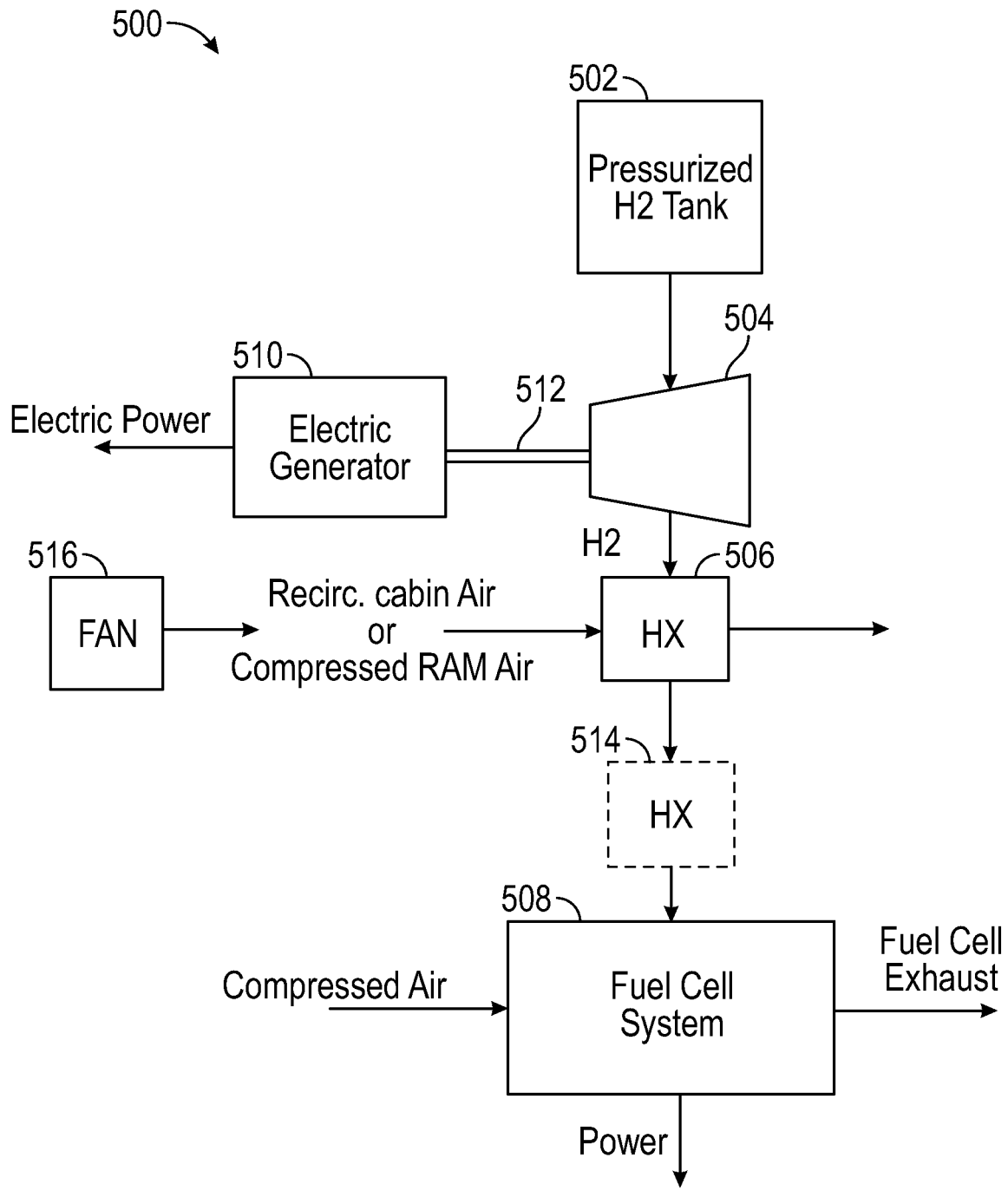
FIG. 5 is a schematic diagram of an aircraft pressurized hydrogen power system in accordance with an embodiment of the present disclosure.

Referring now to FIG. 5, an aircraft pressurized hydrogen power system 500 is schematically shown. The pressurized hydrogen power system 500 includes a pressurized $H_2$ tank 502, a turbo expander 504, a fuel-to-air heat exchanger 506, and a fuel cell system 508. The fuel cell system 508 may be configured similar to that shown and described above, such as in FIGS. 2-3, for example. In some embodiments, the fuel cell system 508 may be configured to generate electrical power sufficient for flight propulsion or may be configured to generate electrical power for use onboard the aircraft (e.g., to power electrical systems of the aircraft).

In this embodiment, the turbo expander is operably coupled to an electric generator 510 by a shaft 512. In this configuration, the highly pressurized $H_2$ sourced from the pressurized $H_2$ tank 502 expands within the turbo expander 504 to drive rotation of the shaft 512. The electric generator 510 is configured to convert rotational energy from the shaft 512 into electrical power. The electrical power produced by the electric generator 510 can be stored, for example in batteries or distributed and/or used onboard the aircraft. For example, in some embodiments, the electrical power output of the electric generator 510 may be used to drive a compressor or pump to produce compressed air for the fuel cell system 508 and/or to be passed into the fuel-to-air heat exchanger 506 for treating and conveyance to a cabin ventilation system or otherwise fed to other components in an ECS or other aircraft system. In some non-limiting embodiments, the electric generator 510 may be configured to generate and output up to 100 kW, although a specific sized generator may be selected to be used on a particular aircraft (e.g., based on energy demands of such aircraft). As the generator will add weight to the system, the sizing and output may be optimized to a particular aircraft configuration (e.g., based on passengers or other requirements).

In this embodiment, the fuel-to-air heat exchanger 506 may be configured to receive recirculated cabin air and/or compressed ram air. In either case, the ram air may be compressed using an electrically driving compressor. It will be appreciated that recirculated cabin air may not require any additional compression, and it is the ram air that is compressed. The power for such compressor may be supplied from the electric generator 510. Similar to the embodiment of FIG. 4, while expanding in the turbo expander, the temperature of the $H_2$ will be reduced. As such, before the $H_2$ is fed into the fuel cell system 508, it is required that the temperature of the $H_2$ be increased. Similar to the embodiment of FIG. 4, the relatively cold hydrogen can be used within one or more heat exchangers to cool down air and/or other working fluids onboard the aircraft. For example, the fuel-to-air heat exchanger 506 may receive air flowing in a cabin air recirculation loop. Alternatively, or additionally, compressed air sourced from ambient may be used for cabin supply and/or other onboard purposes, with such air being cooled within the fuel-to-air heat exchanger 506. Further, similar to the embodiment of FIG. 4, and additional heat exchanger 514 may be arranged downstream of the fuel-to-air heat exchanger 506 and upstream of the fuel cell system 508.

The fuel-to-air heat exchanger 506 may be sufficient to cool cabin air (regardless of source), thus eliminating the need of an ECS pack, as described above. Because such a configuration can allow for the complete elimination of an ECS pack, an additional fan 516 may be used on the ground to bring external (ambient) air into the system.

Figure 6:
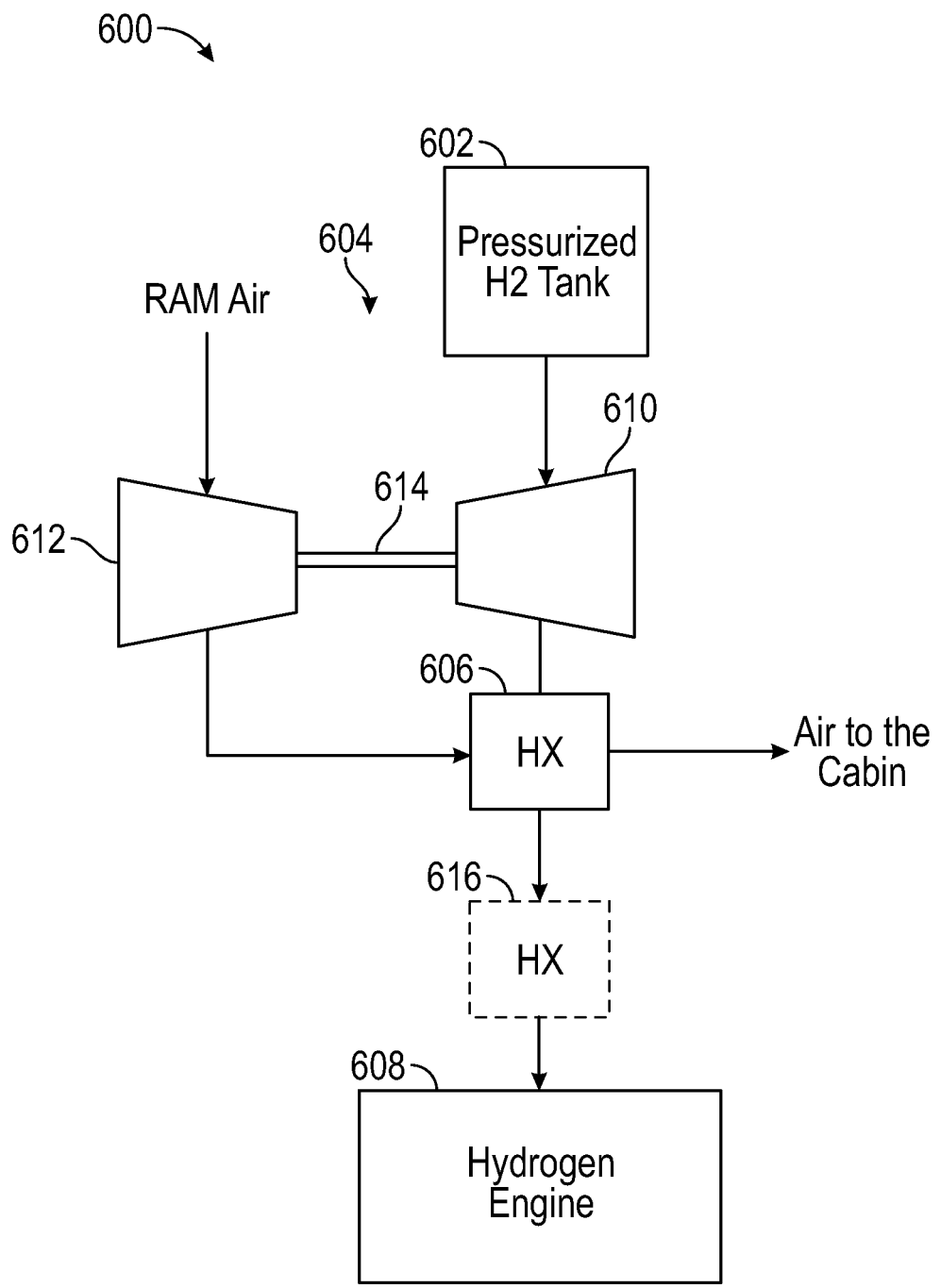
FIG. 6 is a schematic illustration of an aircraft pressurized hydrogen engine system in accordance with an embodiment of the present disclosure.

Turning now to FIG. 6, an aircraft pressurized hydrogen engine system 600 is schematically shown. The pressurized hydrogen engine system 600 includes a pressurized $H_2$ tank 602, a turbo-compressor 604, a fuel-to-air heat exchanger 606, and a hydrogen engine system 608. The hydrogen engine system 608 may be a combustion engine configured to combust hydrogen, in contrast to the fuel cell systems described above. The turbo-compressor 604, similar to that described above, includes a turbo expander 610 and a compressor 612 operably coupled by a shaft 614. An additional heat exchanger 616 may be arranged between the fuel-to-air heat exchanger 606 and the hydrogen engine system 608. It will be appreciated that the system of FIG. 6 is schematic and could be arranged, alternatively, similar to the configuration of FIG. 5 and may include additional components such as additional heat exchangers, generators, motors, and the like.

It will be appreciated that although described herein as a hydrogen-based system, various other types of low carbon or no carbon fuels may be employed and replace the hydrogen described herein. For example, in a non-limiting embodiment, the fuel may be ammonia ($NH_3$). In such a configuration, the output may be nitrogen ($N_2$) and water ($H_2O$).

As such, in accordance with embodiment of the present disclosure, a pressurized fuel may be directed from a pressurized fuel tank to a fuel consumption system. The pressurized fuel may be hydrogen, ammonia, or other pressurized fuel. The fuel consumption system may be a fuel cell, a hydrogen burning engine, or system that consumed the fuel for generation of power (e.g., electrical power, thrust, or the like).

Advantageously, embodiments of the present disclosure provide for use of hydrogen or other low temperature fuels to be used to supplement and/or replace other convention aircraft systems, such as ECS components. Because such systems and configurations may not require the installation of an ECS pack, this results in lower system weight and less energy consumption to condition the cabin air. Further, because there is no ram air usage within a primary and/or main heat exchanger to cool down the cabin air, there may be a reduction in ECS associated fuel burn consumption. Advantageously, the cooling fluid used for conditioning the ram air is the $H_2$, so that there is no need of ram air to be used to cool the external air from outside as in traditional ECS configurations. This eliminates the fuel burn penalty due to the ram drag. Additionally, by using the hydrogen or other cold fuel to cool the cabin air, the fuel has heat pick up and thus may be warmed to appropriate temperatures for use within a fuel cell and/or fuel burning engine. Additionally, in embodiments that couple a compressor to a fuel turbo expander, no additional power may be required to increase the pressure of the ram air for use in a cabin air system. Furthermore, advantageously, embodiments described herein can include motor and/or generators to generate additional electrical power onboard aircraft, such as beyond a fuel cell power generator.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed:

1. A fuel and air system for an aircraft comprising:
  a pressurized fuel tank containing a pressurized fuel;
  a turbo-compressor comprising a turbo expander and a compressor operably coupled by a shaft, wherein the turbo expander is configured to receive the pressurized fuel from the pressurized fuel tank, the turbo expander configured to decrease a pressure of the pressurized fuel to generate low pressure fuel, wherein the low pressure fuel has a pressure that is less than the pressurized fuel;
  a fuel-to-air heat exchanger configured to receive the low pressure fuel from the turbo expander as a first working fluid and compressed air as a second working fluid from the compressor, the heat exchanger configured to cool the compressed air to generate conditioned air and warm the low pressure fuel to generate treated fuel;
  a cabin of the aircraft, wherein the conditioned air is supplied into the cabin of the aircraft; and a fuel consumption system configured to consume the treated fuel to generate power.

2. The aircraft system of claim 1, wherein the pressurized fuel is pressurized hydrogen.

3. The aircraft system of claim 1, wherein the pressurized fuel is pressurized ammonia.

4. The aircraft system of claim 1, wherein the compressor is configured to receive ram air and compress said ram air and increase pressure thereof to generate the compressed air.

5. The aircraft system of claim 1, further comprising a motor operably coupled to the shaft and configured to generate electrical power.

6. The aircraft system of claim 1, further comprising an electric generator operably coupled to the turbo expander by the shaft, the electric generator configured to generate electric power.

7. The aircraft system of claim 1, wherein the fuel consumption system is a fuel cell.

8. The aircraft system of claim 7, wherein the fuel cell is one of a solid oxide fuel cell and a proton exchange membrane (PEM).

9. The aircraft system of claim 7, wherein the fuel cell receives pressurized air containing oxygen.

10. The aircraft system of claim 9, wherein the pressurized air is pressurized by the compressor.

11. The aircraft system of claim 1, wherein the fuel consumption system is a hydrogen burning engine.

12. The aircraft system of claim 1, further comprising an additional heat exchanger arranged between the fuel-to-air heat exchanger and the fuel consumption system, wherein the additional heat exchanger receives the treated fuel from the fuel-to-air heat exchanger as a first working fluid and an aircraft system working fluid as a second working fluid.

13. The aircraft system of claim 12, wherein the aircraft system working fluid is a fluid used to cool aircraft powered electronics.

14. The aircraft system of claim 1, further comprising a fan configured to direct air into the fuel-to-air heat exchanger.

15. An aircraft comprising:
a fuselage;
wings; and
a pressurized fuel tank containing a pressurized fuel;
a turbo-compressor comprising a turbo expander and a compressor operably coupled by a shaft, wherein the turbo expander is configured to receive the pressurized fuel from the pressurized fuel tank, the turbo expander configured to decrease a pressure of the pressurized fuel to generate low pressure fuel, wherein the low pressure fuel has a pressure that is less than the pressurized fuel;
a fuel-to-air heat exchanger configured to receive the low pressure fuel from the turbo expander as a first working fluid and compressed air as a second working fluid from the compressor, the heat exchanger configured to cool the compressed air to generate conditioned air and warm the fuel to generate treated fuel;
an aircraft cabin configured to receive the conditioned air; and
a fuel consumption system configured to consume the treated fuel to generate power,
wherein the fuel consumption system is installed to at least one of the fuselage and the wings.

16. The aircraft of claim 15, wherein the fuel consumption system is a fuel cell system configured to generate power for flight of the aircraft.

17. The aircraft of claim 15, further comprising a fan configured to direct air into the fuel-to-air heat exchanger when the aircraft is on the ground.

18. The aircraft of claim 15, wherein the air in the fuel-to-air heat exchanger is recirculated cabin air from the cabin of the aircraft.

19. The aircraft of claim 15, wherein the fuel-to-air heat exchanger is configured to receive air from a ram air source.

20. The aircraft of claim 15, further comprising an additional heat exchanger arranged between the fuel-to-air heat exchanger and the fuel consumption system, wherein the additional heat exchanger receives the treated fuel from the fuel-to-air heat exchanger as a first working fluid and an aircraft system working fluid as a second working fluid.

* * * * *